US010324512B2

(12) United States Patent
Nicholson et al.

(10) Patent No.: US 10,324,512 B2
(45) Date of Patent: Jun. 18, 2019

(54) DEVICE POWER MANAGEMENT BASED ON DETECTED POWER SOURCE

(71) Applicant: Lenovo (Singapore) Pte. Ltd., Singapore (SG)

(72) Inventors: John Weldon Nicholson, Cary, NC (US); Kenneth Scott Seethaler, Wake Forest, NC (US); Howard Locker, Cary, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 268 days.

(21) Appl. No.: 14/067,370

(22) Filed: Oct. 30, 2013

(65) Prior Publication Data
US 2015/0121098 A1 Apr. 30, 2015

(51) Int. Cl.
| | |
|---|---|
| *G06F 1/32* | (2019.01) |
| *G06F 1/26* | (2006.01) |
| *G06F 1/3206* | (2019.01) |
| *G06F 1/3234* | (2019.01) |
| *H04L 12/10* | (2006.01) |
| *H02M 3/335* | (2006.01) |

(52) U.S. Cl.
CPC .............. *G06F 1/3206* (2013.01); *G06F 1/26* (2013.01); *G06F 1/263* (2013.01); *G06F 1/266* (2013.01); *G06F 1/3234* (2013.01); *H04L 12/10* (2013.01); *H02M 3/335* (2013.01)

(58) Field of Classification Search
None
See application file for complete search history.

(56) References Cited

U.S. PATENT DOCUMENTS

| 7,644,295 B1 * | 1/2010 | Dotson | G06F 1/263 700/12 |
|---|---|---|---|
| 8,193,661 B2 * | 6/2012 | Jagota | H02J 1/10 307/65 |
| 8,963,371 B2 * | 2/2015 | Kinnard | H02J 9/061 307/64 |
| 2008/0272741 A1 * | 11/2008 | Kanamori | G06F 1/266 320/137 |
| 2015/0121098 A1 * | 4/2015 | Nicholson | G06F 1/3206 713/320 |

FOREIGN PATENT DOCUMENTS

| JP | 3649453 | * 2/2005 | ............... F24F 11/02 |
|---|---|---|---|
| JP | 2014-189963 | * 10/2014 | ............... E03D 5/10 |

* cited by examiner

*Primary Examiner* — Tanh Q Nguyen
(74) *Attorney, Agent, or Firm* — Ference & Associates LLC

(57) ABSTRACT

An aspect provides an information handling device, including: a connection to an external power supply; a processor; and a memory; the memory having instructions executable by the processor to: detect that the connection to the external power supply is providing an input of power; ascertain via the connection to the external power supply that the input of power is derived from a source having a predetermined characteristic; and automatically adjust a power consumption setting of the information handling device based on the predetermined characteristic. Other aspects are described and claimed.

19 Claims, 7 Drawing Sheets

DEVICE POWER MANAGEMENT BASED ON DETECTED POWER SOURCE

BACKGROUND

Information handling devices ("devices"), for example desktop computers, laptop computers, tablets, smart phones, e-readers, etc., ultimately derive their operating power from an external power source or supply. When plugged in or connected to the external power supply, the devices operate using this power, often charging an on-board battery at the same time for later mobile use (in the case of a mobile device).

External power sources come in a variety of forms. Traditionally, the external power source is AC power derived from a commercial power supply, e.g., a wall outlet connected to a public utility. This AC power at the wall outlet is converted in an AC/DC converter and provided to the device. Often the AC/DC converter is in an external component, e.g., power "brick" or converter, e.g., included in a wall plug or adaptor that in turn plugs into the device. This has been a trend driven by the reduced size of many mobile devices such as tablets, smart phones and laptops. However, some other devices, e.g., desktops, retain converter components onboard.

Additionally, rather than a public utility supply, AC power may be supplied by a universal power supply (UPS). Such UPS arrangements are often used in addition to power supplied from a commercial power supply, e.g., to guard against a power failure or utility outage. An example of a UPS is a generator that runs an alternate source of energy (e.g., diesel or natural gas) to charge a battery of the UPS, which then has DC power of the battery converted back into AC power. Converting DC of the UPS battery back to AC output voltage permits devices needing AC to be charged by the UPS while also permitting devices requiring DC power to be charged, e.g., via a plug adaptor or converter—similar to being plugged into the wall outlet.

Conventionally devices attempt to manage power consumption based on the availability of power supply. For example, a device will often be configured to switch a power management setting (or group of settings) to conserve power if integrated battery power supply is detected, with the thought being that the DC power is derived from the device battery and a finite supply of power is thus on hand. Devices conventionally switch to a full power management setting on detecting AC adaptor power.

BRIEF SUMMARY

In summary, one aspect provides an information handling device, comprising: a connection to an external power supply; a processor; and a memory; the memory having instructions executable by the processor to: detect that the connection to the external power supply is providing an input of power; ascertain via the connection to the external power supply that the input of power is derived from a source having a predetermined characteristic; and automatically adjust a power consumption setting of the information handling device based on the predetermined characteristic.

Another aspect provides a method, comprising: detecting, in an AC/DC converter, a voltage of an external power supply; ascertaining that the voltage is derived from a source having a predetermined characteristic; and providing a signal to an information handling device receiving DC power supply from the AC/DC converter to automatically adjust a power consumption setting of the information handling device based on the predetermined characteristic.

A further aspect provides a method, comprising: detecting, at an information handling device, a voltage of an external power supply; ascertaining, via the connection to the external power supply of the information handling device, that the input of power is derived from a source having a predetermined characteristic; and automatically adjusting a power consumption setting of the information handling device based on the predetermined characteristic.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
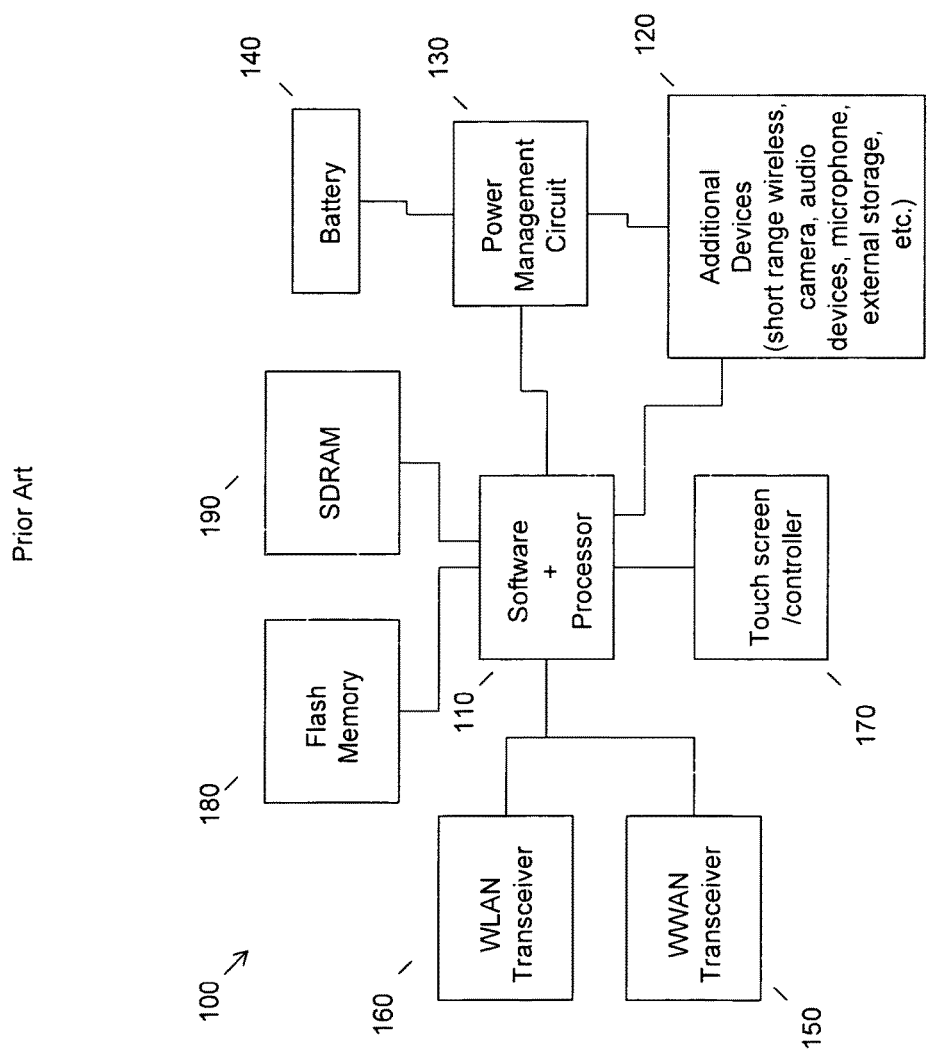
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Devices conventionally have many power management features, such as central processing unit (CPU) throttling, graphics processor unit (GPU) routing, screen brightness adjustments, idle timers, etc. Automatic management of the aggressiveness of these power management settings is an important capability in managing device power consumption. One of the settings or contexts in which power management is attempted to be handled automatically conventionally is whether AC adaptor power is connected, or the system is using its own integrated battery power. However if a system is running on a battery back-up power source, such as a UPS, the device will run in the AC adaptor power connected context even though the ultimate source of the power is the UPS battery, charged by a finite power supply, as above. Thus, conventionally devices do not distinguish between types of AC when implementing various power management settings.

Several types of UPS systems do provide a sideband status (indicating power is supplied via a UPS) through a USB or serial cable. This allows software running on the device receiving the UPS power supply to determine the status of the UPS. However, there are two main problems with this approach. First, the device receiving the power needs to install software from the UPS vendor in order to receive this side band communication. Second, the user needs to connect this side band cable every time the device is using UPS power, which is not consistent with the mobility offered by today's devices. That is, it adds an additional hard wire connection that is made when connecting the device back up to the UPS.

Accordingly, an embodiment provides for distinguishing among various AC power sources or supplies directly in order to provide increased granularity or categorization of the type of AC power being utilized. This in turn allows for better power management decisions, e.g., choosing more conservative power management settings when the device is being supplied AC power via a UPS.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces for example include SDIO and I2C.

There are power management chip(s) 130, e.g., a battery management unit, BMU, which manage power as supplied for example via a rechargeable battery 140, which may be recharged by a connection to a power source (not shown in FIG. 1). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Commonly, system 100 will include a touch screen 170 for data input and display. System 100 also typically includes various memory devices, for example flash memory 180 and SDRAM 190.

Figure 2:
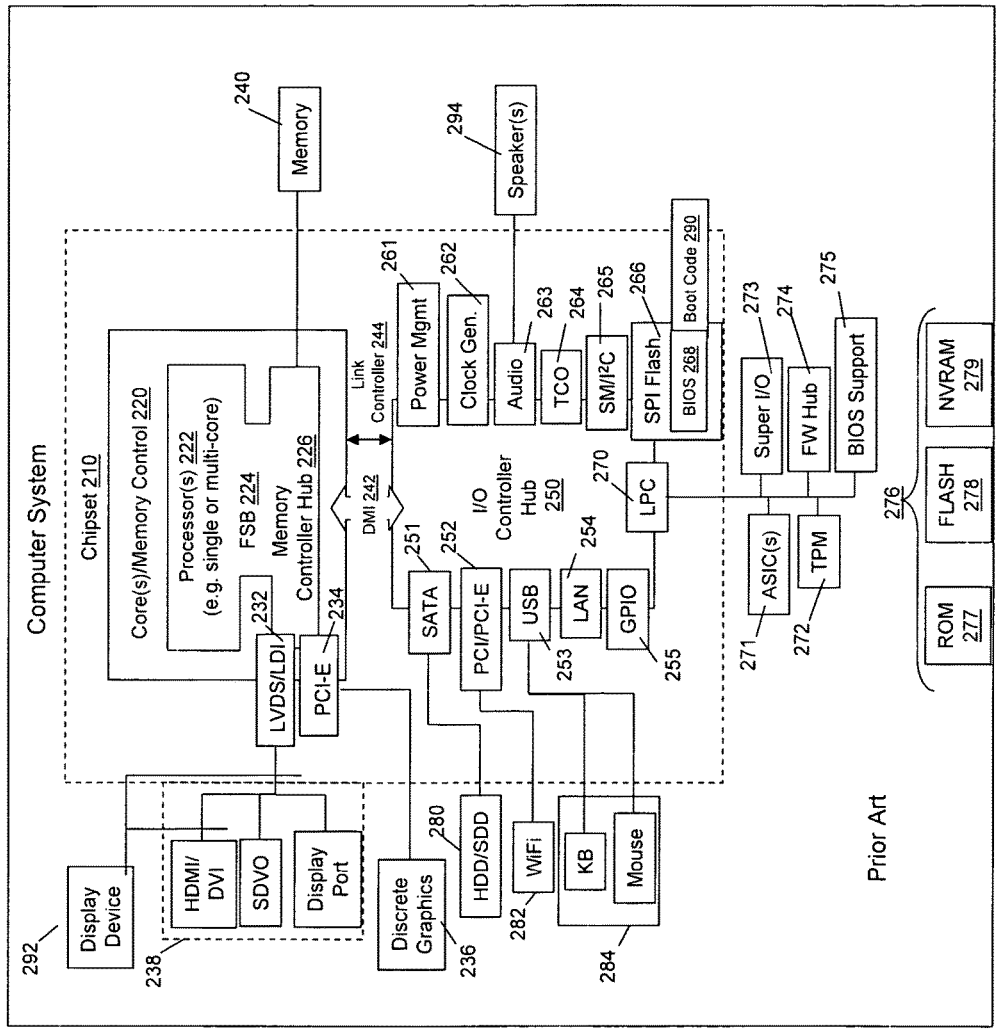
FIG. 2 illustrates another example of an information handling device.
Figure 3A:
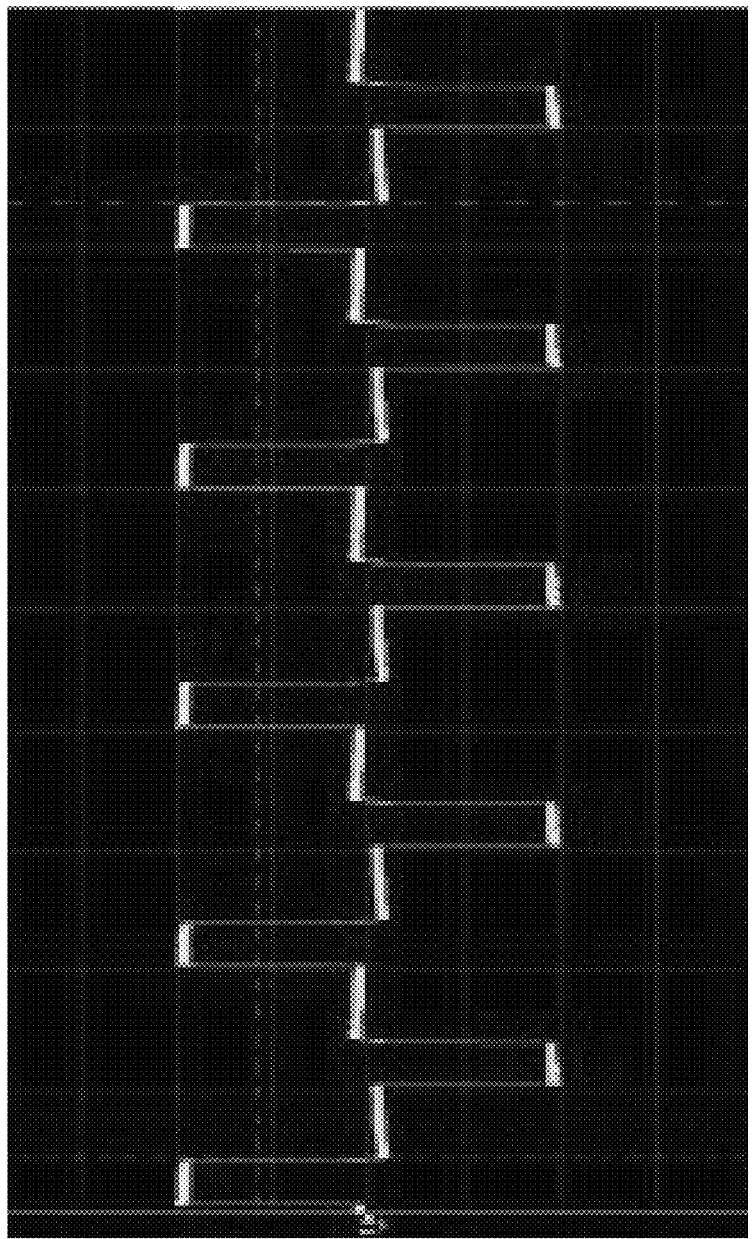
FIG. 3(A-D) illustrates example AC output voltage waveforms form different power supply sources.
Figure 3B:
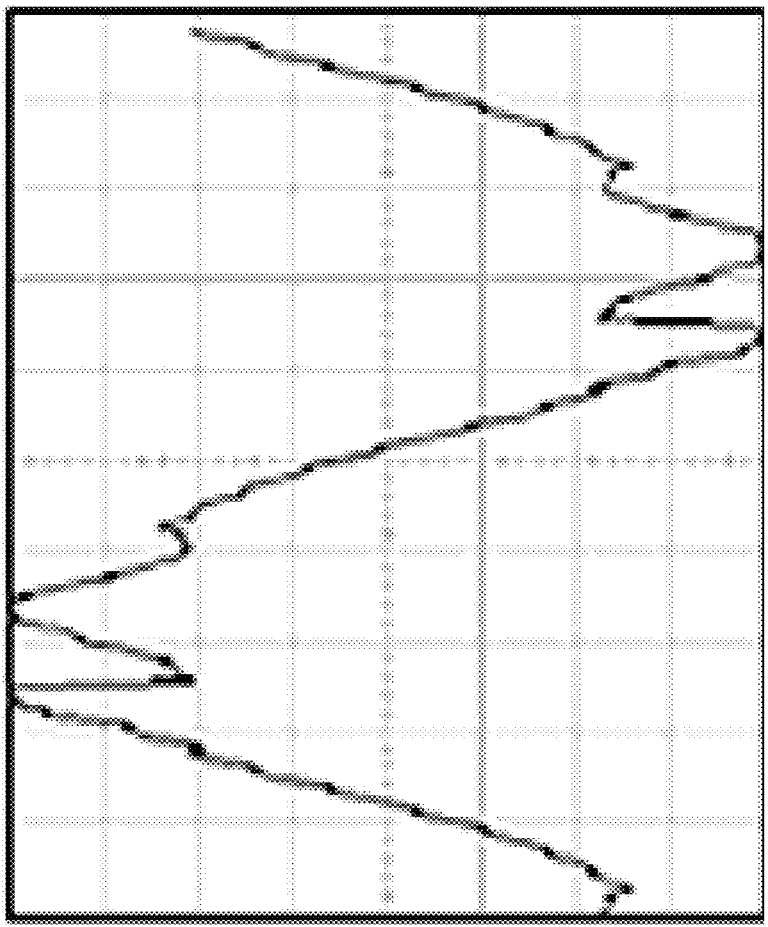
Figure 3C:
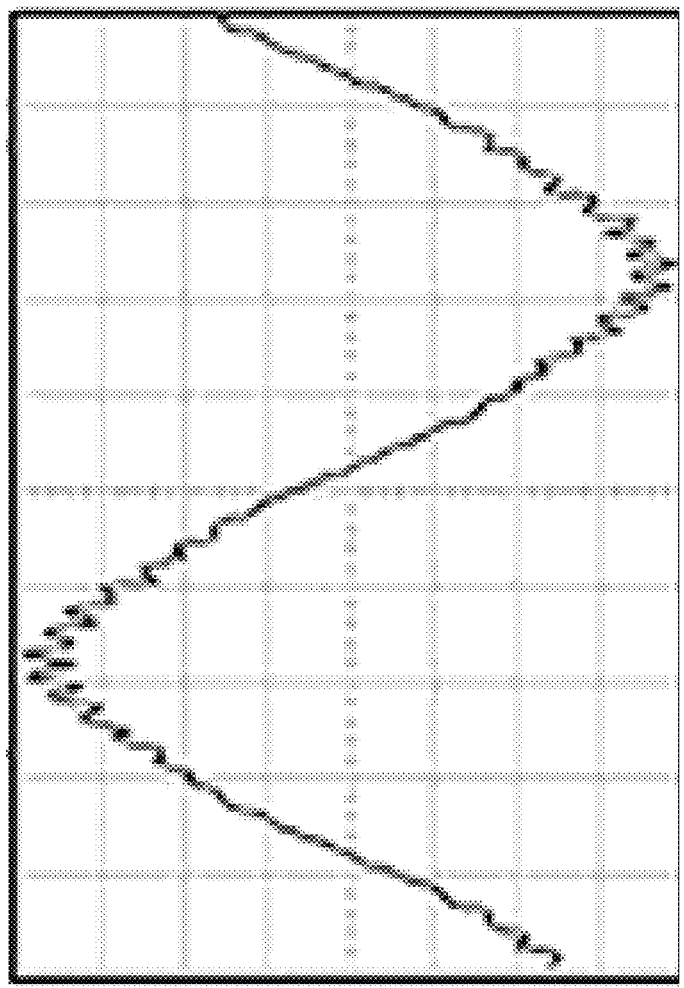
Figure 3D:
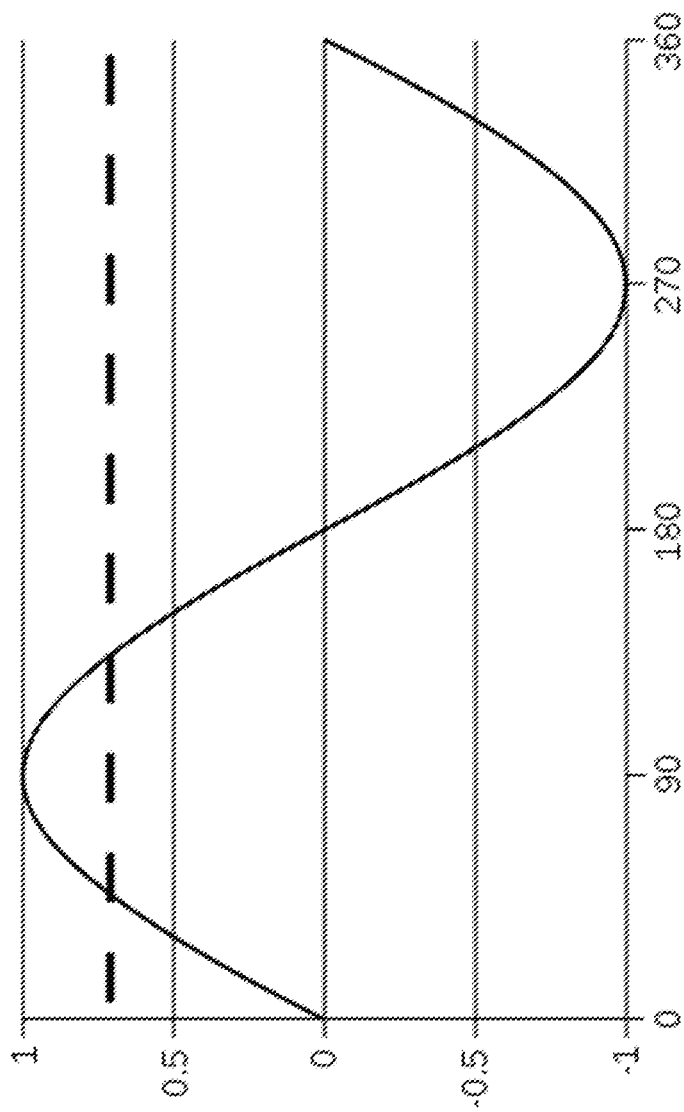

FIG. 2, for its part, depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). The architecture of the chipset 210 includes a core and memory control group 220 and an I/O controller hub 250 that exchanges information (for example, data, signals, commands, et cetera) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, et cetera). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, 280 et cetera), a PCI-E interface 252 (for example, for wireless connections 282), a USB interface 253 (for example, for devices 284 such as a digitizer, keyboard, mice, cameras, phones, microphones, storage, other connected devices, et cetera), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 of FIG. 2, may used in connection with managing power settings. For example, power management circuit 130 and power management interface 261 of FIG. 1 and FIG. 2, respectively, may provide logic to control settings of various device components (e.g., screen brightness settings, CPU throttling, etc.) depending on the power management scheme being implemented. As discussed, conventionally devices will make power management settings decisions based on whether the device is running on integrated battery power or AC adaptor power, which is presumed to be supplied by a commercial/public utility.

In an embodiment a method is provided for distinguishing among various AC power supplies, e.g., UPS supplied AC versus AC derived from a commercial power supply or public utility. In this way, an embodiment may provide an indication that a power supply is DC voltage derived, even if the received output voltage appears as AC. In one example, an embodiment may thus utilize conventional determinations (e.g., AC/DC power management decision logic) with the added benefit of determining if an AC input is in fact derived from a DC source.

In FIG. 3(A-C) are illustrated non-sinusoidal AC output waveforms of a UPS (and generated by a DC source). As can be appreciated by comparison to FIG. 3D, which illustrates an ideal sinusoidal AC output waveform of a utility or commercial power supply, the waveforms of FIG. 3A-3C are distinguishable.

An embodiment detects a generator or UPS operating in battery mode by observing the shape and frequency content of the AC power signal. Unless the non-commercial power supply is a "Pure Sine Wave" type (e.g., a high end UPS or generator), the output waveform of the power supply has the correct frequency and RMS voltage as the supply from the utility, but the waveforms typically looks something like those shown in FIG. 3(A-C), which are decidedly non-sinusoidal, as opposed to the illustrated example in FIG. 3D.

Because the UPS/generator AC output waveform signals are non-sinusoidal signals, their signals contain more energy at higher frequency components. Detecting this type of signal, i.e., having higher frequency components may be done according to a variety of techniques. For example, a Fourier transform may be implemented to determine the energy content at the various frequencies, using the detection of energy above a threshold level at higher frequency to distinguish commercial AC waveforms from UPC AC waveforms. Alternatively, a low pass filter may be applied to remove high frequency content, followed by a determination of how much energy has been lost via the filtering process. Thus, the larger energy losses may be used to distinguish UPS AC from commercially sourced AC. Once the type of AC source is detected, the device can control power consumption of various components.

Figure 4:
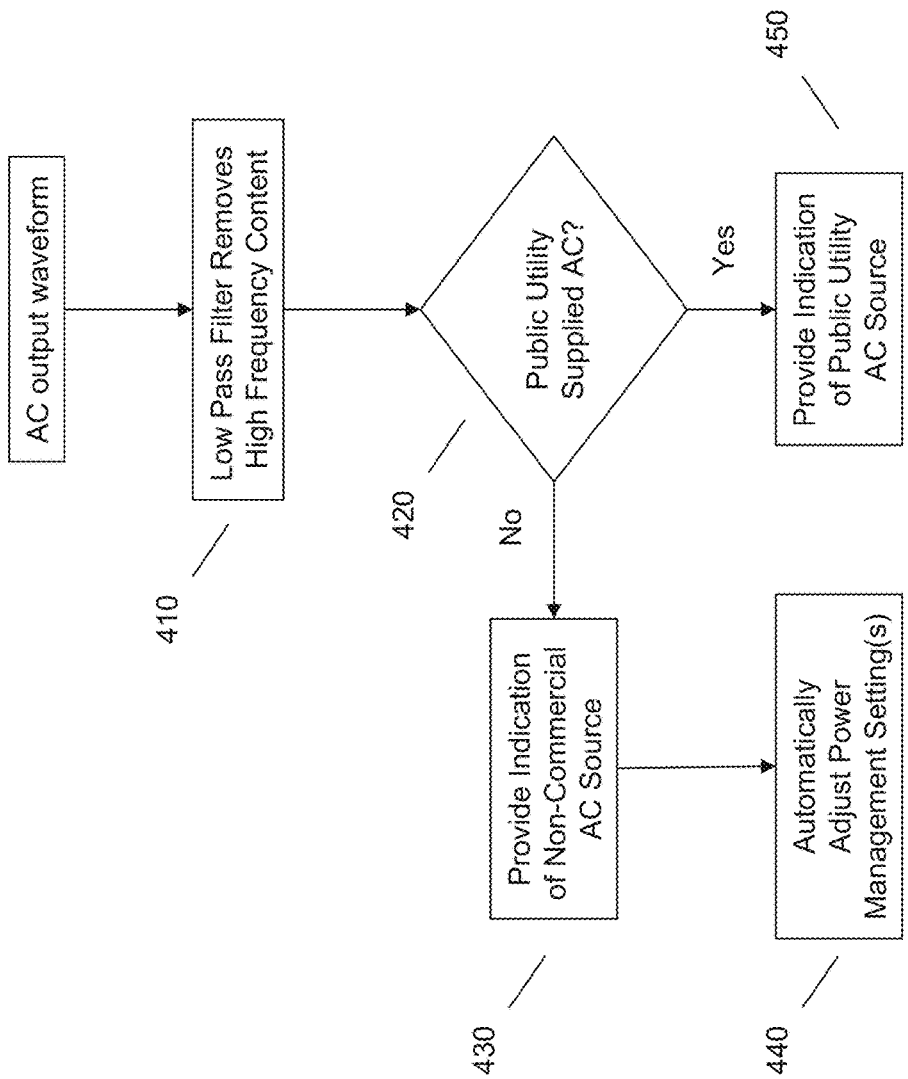
FIG. 4 illustrates an example method for device power management based on detected power source.

Thus, referring to FIG. 4, an example method for device power management based on detected power source is illustrated. As an AC output waveform is detected, e.g., in a circuit provided in an AC/DC power converter of a device, a low pass filter may be utilized to remove high frequency content of the AC output waveform at 410. Again, other methods for analyzing the AC output waveform may be utilized in addition to or in lieu of the example illustrated in FIG. 4. In any event, the analysis of the AC output waveform allows an embodiment to make a determination at 420 if the AC output waveform is commercially supplied. If so, e.g., the AC/DC converter is receiving AC from a wall outlet, an indication may be provided that the AC is derived from a commercial power source. This indicator may be provided to the device connected to or containing the AC/DC converter such that the device may implement appropriate power management settings given that the device is connected to a commercial power supply.

Alternatively, if it is determined that the power supply is not derived from a commercial power supply, e.g., the AC output waveform is non-sinusoidal and thus can be categorized as being derived or originating from a UPS or generator DC source, an indicator of non-commercially supplied AC may be provided at 430. Again, such an indication may be utilized by a device to automatically adjust power management setting(s) at 440 given that the AC power source is not being derived from a commercial power supply. For example, at 440 the device may adjust downward certain power management settings, e.g., screen brightness, in order to conserve power, even though there is an AC power supply input.

As will be appreciated from the foregoing, an embodiment provides a method for detecting, at a device, that a connection to an external power supply is providing an input of power. The method includes ascertaining, e.g., via the connection to the external power supply the device, an indicator that the input of power is derived from a source selected from a group of predetermined source categories, e.g., commercial power supply or non-commercial power supply. The method further allows the device to automatically adjust power consumption setting(s) of the device based on the source category ascertained. Therefore, devices may make better choices with respect to use of power, particularly allowing the devices to conserve power even when an AC power supply is provided, but not from a commercial supply.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage medium is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
    a connection to an external power supply;
    a processor; and
    a memory;
    the memory having instructions executable by the processor to:
    detect that the connection to the external power supply is providing an input of AC power;
    identify a power source of the input of AC power by distinguishing between a commercial supply AC power source and a non-commercial supply AC power source based on a characteristic of the input of AC power, wherein to identify comprises determining the shape of the input of AC power waveform and applying a low pass filter to the input of AC power and determining an amount of energy lost via the low pass filter; and
    thereafter automatically adjust, based upon the power source identified, a power consumption setting of the information handling device.

2. The information handling device of claim 1, wherein the processor receives a signal from a circuit in an AC/DC power converter that provides information about the input of AC power.

3. The information handling device of claim 2, wherein the processor determines if the input of AC power is power supplied by a public utility based on AC waveform.

4. The information handling device of claim 3, wherein the power supplied by a public utility is delivered to a wall outlet.

5. The information handling device of claim 1, wherein the characteristic comprises high frequency energy.

6. The information handling device of claim 1, wherein to automatically adjust a power consumption setting of the information handling device comprises reducing power consumption of at least one hardware component of the information handling device based upon identifying the power source as a noncommercial AC power source.

7. A method, comprising:
    detecting, in an AC/DC converter, a voltage of an external AC power supply;
    determining a power source of the external AC power supply by distinguishing between a commercial supply AC power source and a non-commercial supply AC power source based on the voltage of the external AC power supply, wherein the determining comprises determining the shape of the voltage of the external AC power supply waveform and applying a low pass filter to the external AC power supply and determining an amount of energy lost via the low pass filter; and
    thereafter providing, based upon the power source determined, a signal to an information handling device to automatically adjust a power consumption setting of the information handling device.

8. The method of claim 7, wherein the determining a power source of the external AC power supply is performed by a circuit in the AC/DC power converter, the circuit categorizing the voltage of the power source.

9. The method of claim 8, wherein the categorizing comprises determining if the voltage originates from a public utility based on AC waveform.

10. The method of claim 9, wherein the power supplied by a public utility is delivered to a wall outlet.

11. The method of claim 9, wherein the determining if the voltage originates from a public utility comprises determining that the voltage has a waveform and the waveform is substantially non-sinusoidal.

12. The method of claim 11, wherein the determining if the waveform is substantially non-sinusoidal comprises categorizing frequency characteristics of the waveform.

13. The method of claim 12, wherein categorizing frequency characteristics of the waveform comprises determining if the energy of the frequency of the waveform exceeds a threshold amount.

14. A method, comprising:
    detecting, at an information handling device, a voltage of an external AC power supply;
    identifying a power source of the external AC power supply by distinguishing between a commercial supply AC power source and a non-commercial supply AC power source based on a characteristic of the external AC power supply, wherein the identifying comprises determining the shape of the voltage of the external AC power supply waveform and applying a low pass filter to the external AC power supply and determining an amount of energy lost via the low pass filter; and
    thereafter automatically adjusting, based upon the power source identified, a power consumption setting of the information handling device.

15. The method of claim 14, wherein the distinguishing comprises receiving a signal from a circuit in an AC/DC power converter that categorizes the output waveform of the power source.

16. The method of claim 15, wherein categorizing the output waveform comprises determining if the output waveform originates from a public utility based on AC waveform.

17. The method of claim 16, wherein the power supplied by a public utility is delivered to a wall outlet.

18. The method of claim 16, wherein the determining if the voltage originates from a public utility comprises determining that the voltage has a waveform and the waveform is substantially non-sinusoidal.

19. The method of claim 18, wherein the determining if the waveform is substantially non-sinusoidal comprises categorizing frequency characteristics of the waveform.

* * * * *